United States Patent [19]

Eguchi et al.

[11] Patent Number: 5,416,505
[45] Date of Patent: May 16, 1995

[54] IMAGE DRAWING APPARATUS

[75] Inventors: Yasuhito Eguchi, Kanagawa; Tohru Naganuma; Toru Nanbara, both of Tokyo, all of Japan

[73] Assignee: Sony Corporation, Tokyo, Japan

[21] Appl. No.: 965,993

[22] Filed: Oct. 23, 1992

[30] Foreign Application Priority Data

| Oct. 29, 1991 | [JP] | Japan | 3-309947 |
| Oct. 29, 1991 | [JP] | Japan | 3-309948 |
| Sep. 7, 1992 | [JP] | Japan | 4-238498 |

[51] Int. Cl.⁶ .................................. B41J 2/435
[52] U.S. Cl. .................................. 347/244
[58] Field of Search ............ 346/1.1, 108, 160, 107 R

[56] References Cited

U.S. PATENT DOCUMENTS

| 4,323,906 | 4/1982 | Ohnishi et al. | 346/108 |
| 4,423,426 | 12/1983 | Kitamura | 346/108 |
| 4,549,190 | 10/1985 | Ohara | 346/108 |
| 5,220,450 | 6/1993 | Iizuka | 346/108 |

*Primary Examiner*—Mark J. Reinhart
*Attorney, Agent, or Firm*—Mark C. Pickering; Limbach & Limbach

[57] ABSTRACT

An image drawing apparatus wherein the scanning speed is reduced without decreasing the image drawing speed for forming an image to achieve reduction of the noise and assure a long life. The image drawing apparatus for drawing an image in accordance with image data comprises a laser light source for generating a plurality of laser beams, a galvano mirror for deflecting the plurality of beams of light generated from the laser light source, and a rotary drum on which a predetermined image is to be drawn by the plurality of beams of light deflected by the galvano mirror.

12 Claims, 16 Drawing Sheets

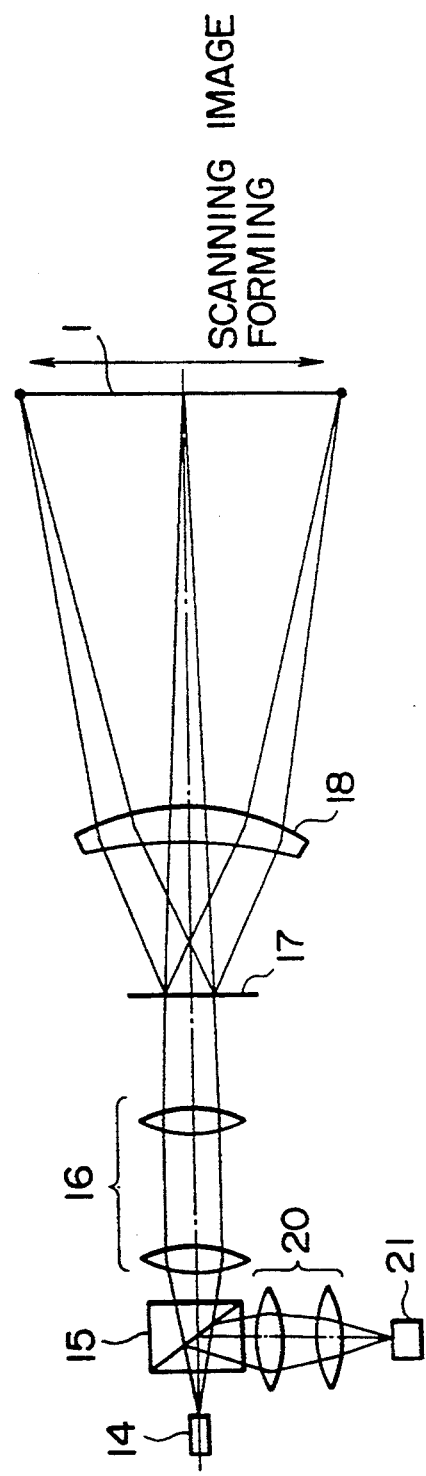
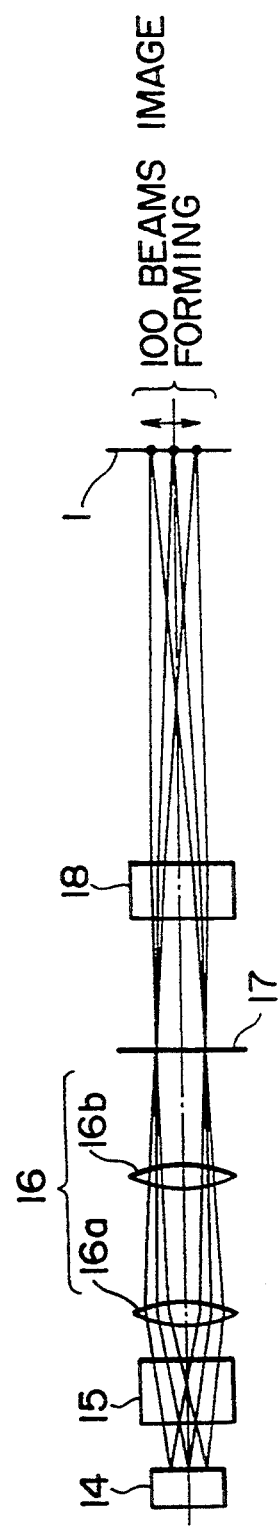
FIG. 4(a)
FIG. 4(b)

FOCAL LENGTH (LONG)
IMAGE POINT MOVEMENT

FOCAL LENGTH (SHORT)

LENS MOVEMENT

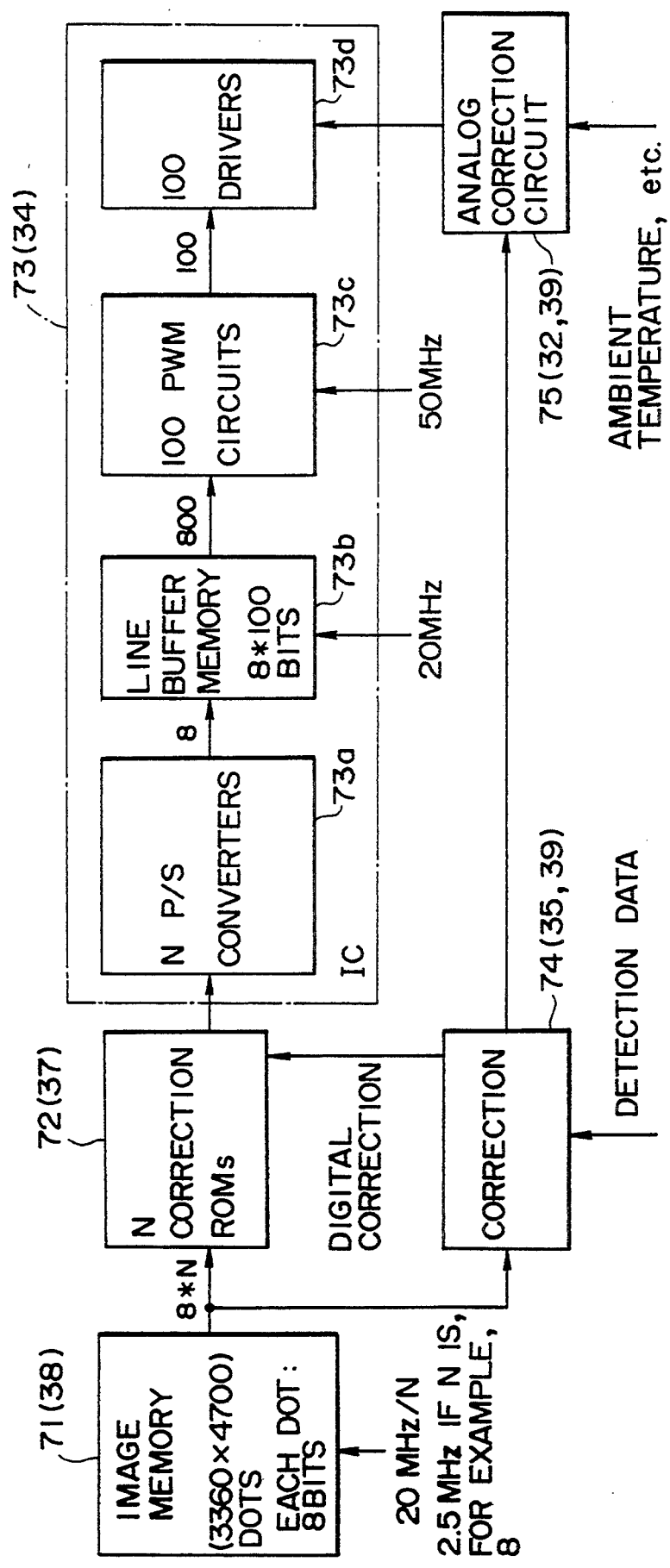

FIG. 13(d) CLOCKS ⎍⎍⎍⎍⎍⎍⎍⎍⎍⎍⎍⎍⎍⎍⎍⎍⎍⎍⎍⎍⎍⎍⎍⎍⎍⎍⎍⎍⎍⎍⎍⎍⎍⎍⎍
CLK 50MHz

| | |
|---|---|
| TOTAL DOT NUMBER | 16128 K |
| MEMORY CAPACITY | 16 MByte |
| SCANNING FREQUENCY | 60Hz (48Hz) |
| SCANNING PERIOD | 17ms (Ret 4ms) |
| PER VERTICAL 100 DOTS | 202 KHz |

100 SPOTS (1 LINE)

47 LINES

CORRECTION FOR OBLIQUE LINES BY IMAGE PROCESSING

17ms
4ms
DIVIDED INTO 3360 DOTS
1 DOT : ABOUT 5μsec.
TAKING DAMPING INTO CONSIDERATION

100 BEAM SPOTS

S1
S2
S100

SCANNING DIRECTION

F I G. 24

| | SCANNING ANGLE | SCANNING FREQUENCY | PICTURE ELEMENT FREQUENCY | LASER ELEMENT SHAPE | OTHERS |
|---|---|---|---|---|---|
| HORIZONTAL DISPOSITION | SEVERAL TENS MINUTES (24 MINUTES) | 4.7 KHz | 450 KHz *(200 KHz) | LONG (5mm OR MORE) | WHEN DEFLECTION IS RESONANCE, CLOCKS HAVE HIGH FREQUENCY CLOCK FREQUENCY: ABOUT 110MHz *(50MHz) MARK * INDICATES THAT OF SAW-TOOTH-WAVE DEFLECTION |
| VERTICAL DISPOSITION | SEVERAL TENS DEGREES (40 DEGREES) | 47 Hz | 200 KHz | SHORT (0.5~1mm) | PRACTICAL SINCE CLOCKS ARE LOW CLOCK FREQUENCY: ABOUT 50 MHz |

IMAGE DRAWING APPARATUS

BACKGROUND OF THE INVENTION

1. Field of the Invention

This invention relates to an image drawing apparatus which draws an image in accordance with image data, and more particularly to an image drawing apparatus suitable for use with, for example, a laser beam printer, a copying machine and like apparatus.

2. Description of the Related Art

Conventional laser beam printers are normally constructed such that a single laser beam is scanned at a high speed on a rotary drum by means of a polygon mirror while the rotary drum is rotated at a predetermined speed to draw a predetermined image on the rotary drum. Since it is difficult to set all faces of the polygon mirror in parallel to an axis of rotation thereof, inclination of the faces of the polygon mirror with respect to the axis of rotation is corrected using a correcting lens. Since the distances from the source of the laser beam to a central position and an end position are different from each other, deformation of an image takes place. In order to correct the deformation of the image, an fθ lens is interposed between the polygon mirror and the rotary drum. Consequently, spool-shaped deformation of an image which takes place where no fθ lens is interposed is corrected.

In order to achieve high speed printing with such a printer, it is necessary to raise the speed of rotation of the polygon mirror to a high speed. For example, in order to print the size A4 in one second with 400 DPI, the speed of rotation of the polygon mirror which has six faces is about 50,000 rpm. Further, in this instance, when the gradation of half tones includes 256 steps, the laser modulating frequency is about 4 GHz.

The conventional laser beam printer has a limitation in increase of the printing speed since it achieves high speed printing by rotating the polygon mirror at a high speed in this manner. Further, there is a subject that not only high noise is generated by high speed rotation of the polygon mirror, but also the life of the laser beam printer is shortened. In addition, since an fθ lens having a high degree of accuracy is expensive, also the entire laser beam printer is expensive.

SUMMARY OF THE INVENTION

It is an object of the present invention to provide an image drawing apparatus wherein the scanning speed is reduced without decreasing the image drawing speed for forming an image to achieve reduction of the noise and assure a long life.

It is another object of the present invention to provide an image drawing apparatus wherein an image can be drawn by a simple scanning system having a reduced scanning angle and the overall size of the apparatus is small.

It is a further object of the present invention to provide an image drawing apparatus which does not require an optical system having a high degree of accuracy and can be produced at a low cost.

In order to attain the objects, according to the present invention, there is provided an image drawing apparatus for drawing an image in accordance with image data, which comprises a light source for generating a plurality of beams of light, deflecting means for deflecting the plurality of beams of light generated from the light source, and a rotary member on which a predetermined image is to be drawn by the plurality of beams of light deflected by the deflecting means.

The above and other objects, features and advantages of the present invention will be apparent from the following detailed description of preferred embodiments when read in conjunction with the accompanying drawings, in which like reference numerals are used to identify the same or similar parts in the several views.

BRIEF DESCRIPTION OF THE INVENTION

Figure 1:
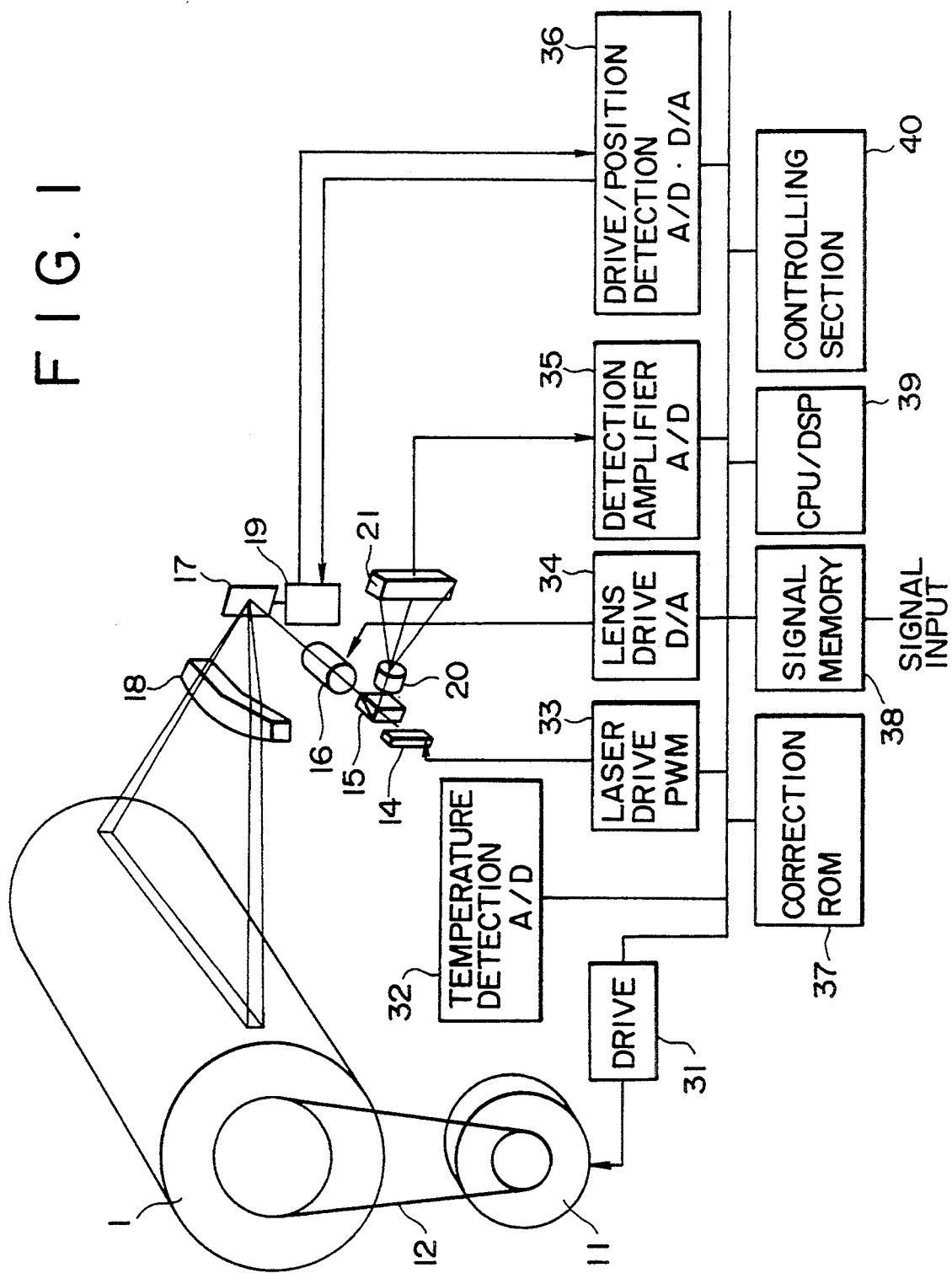
FIG. 1 is a block diagram of a laser beam printer to which an image drawing apparatus of the present invention is applied.
Figure 5A:
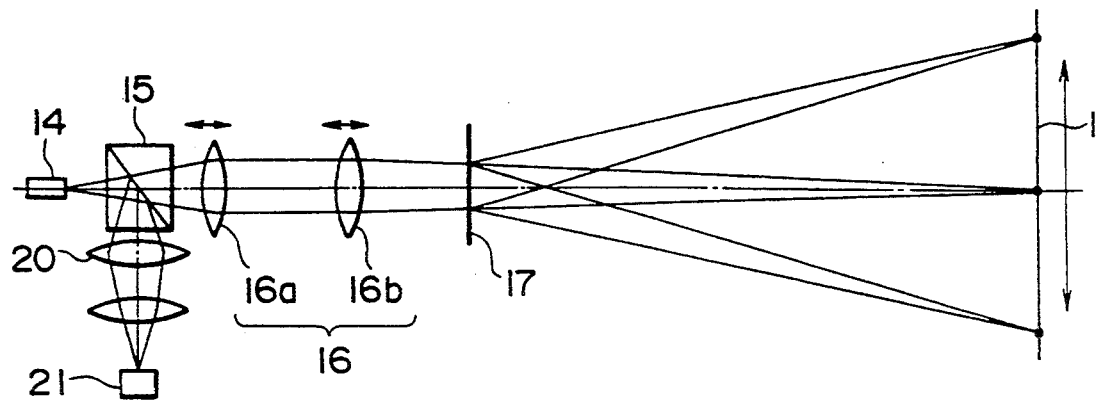
Figure 5B:
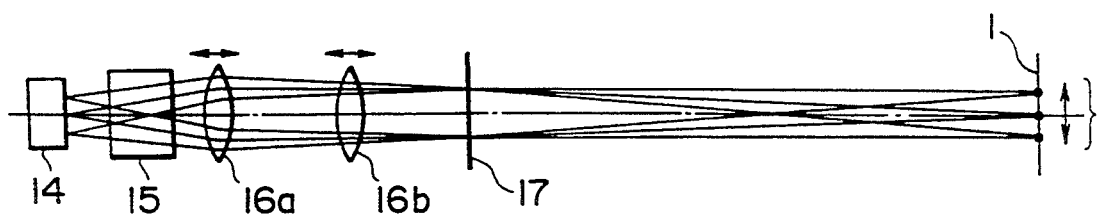
Figure 6A:
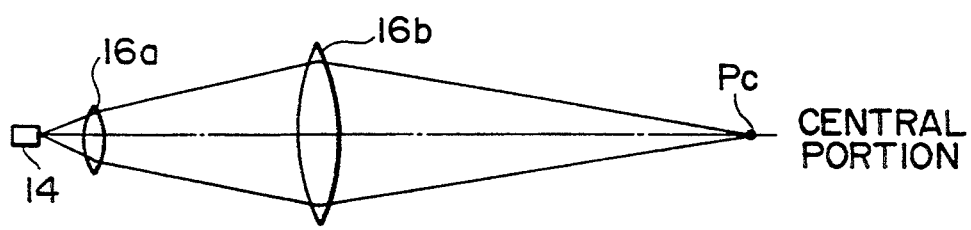
Figure 6B:
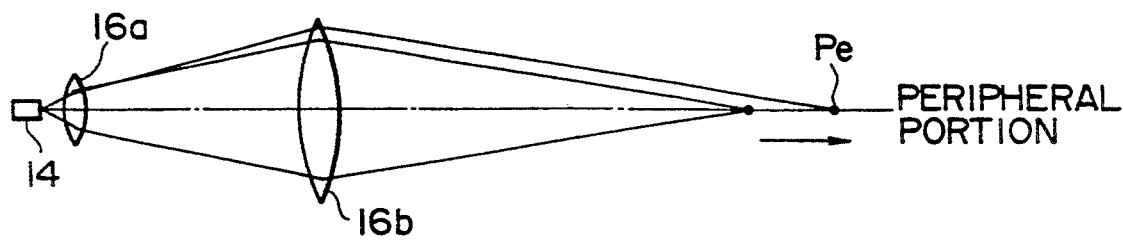
Figure 7:
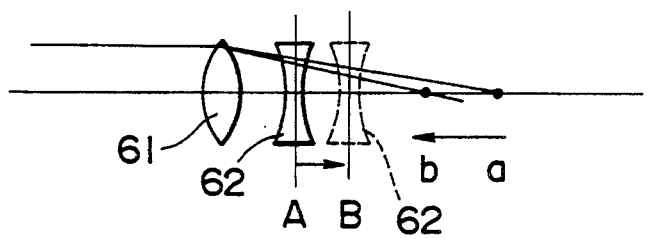
Figure 8A:
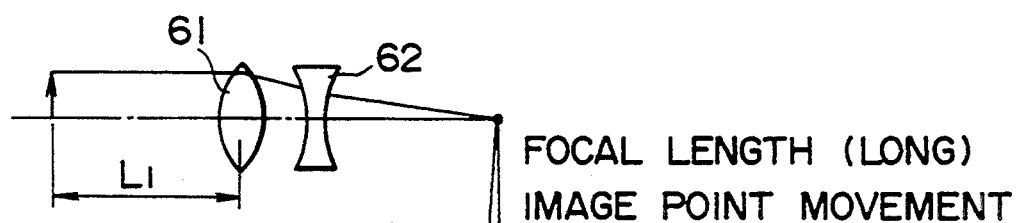
Figure 8B:
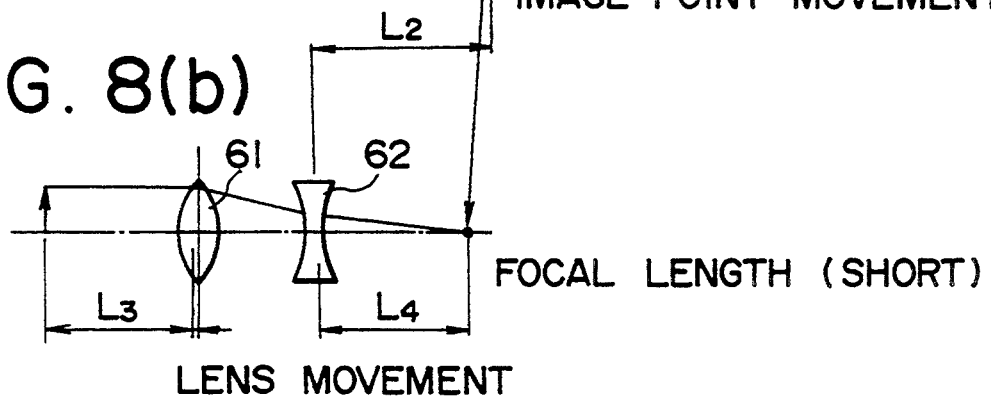
Figure 9:
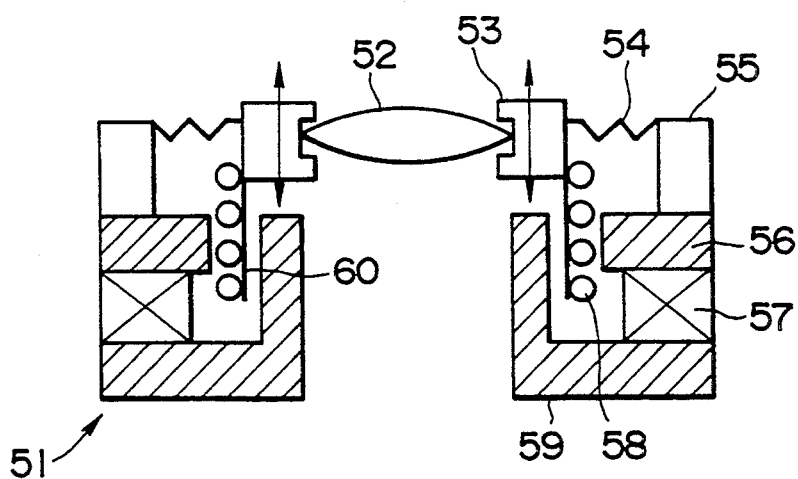
Figure 10A:
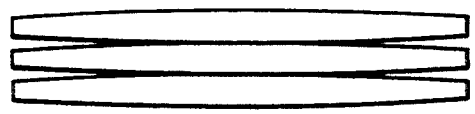
Figure 10B:
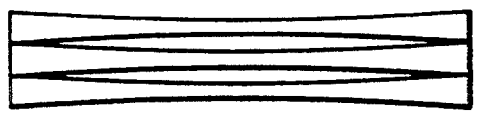
Figure 10C:
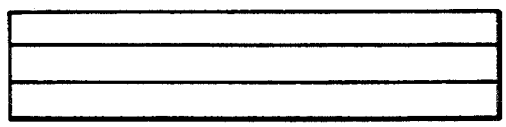
Figure 12:
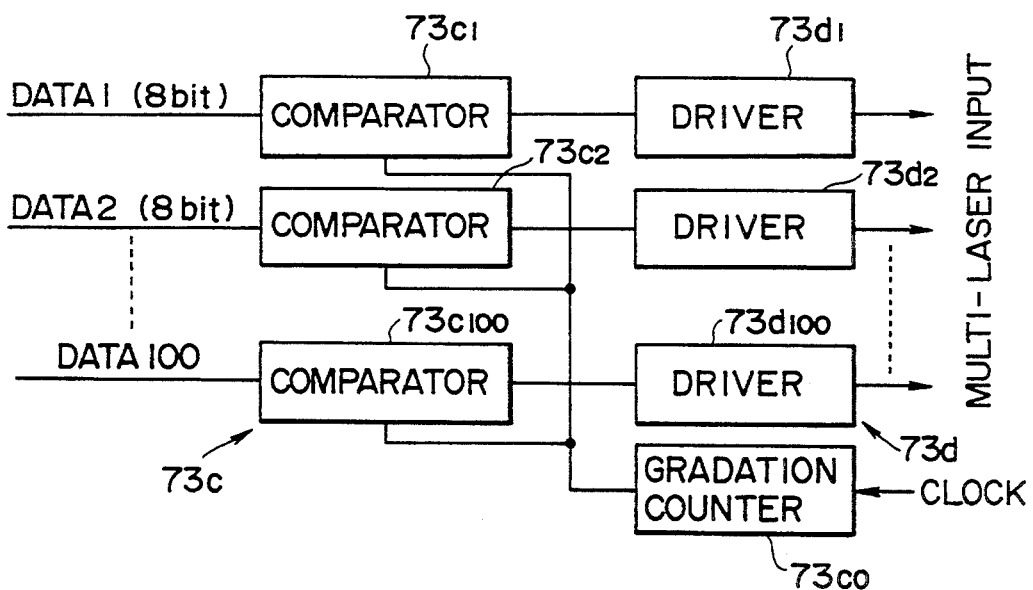
Figure 13A:
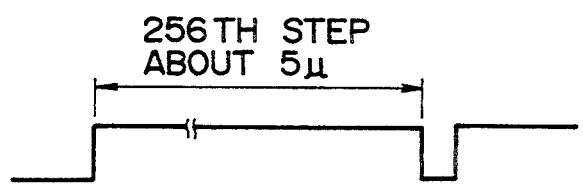
Figure 13B:
Figure 13C:
Figure 14:
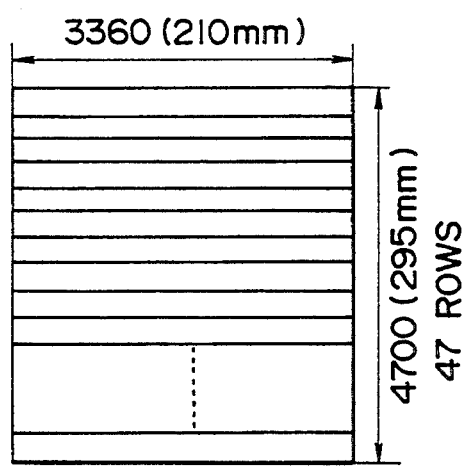
Figure 15:
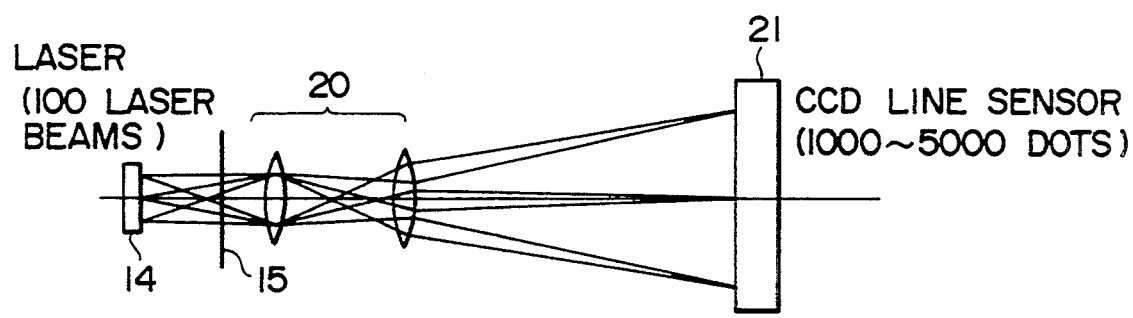
Figure 16:
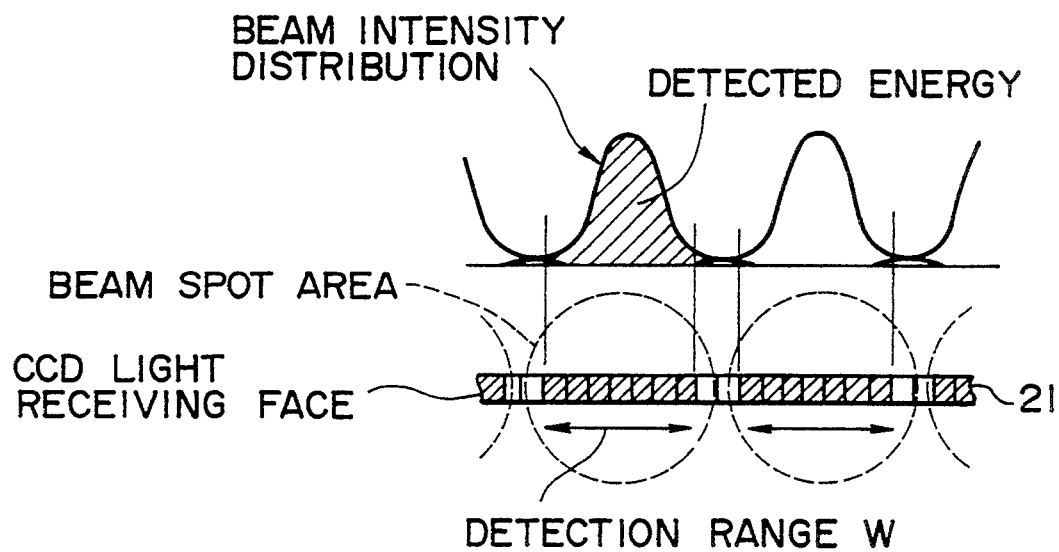
Figure 17:
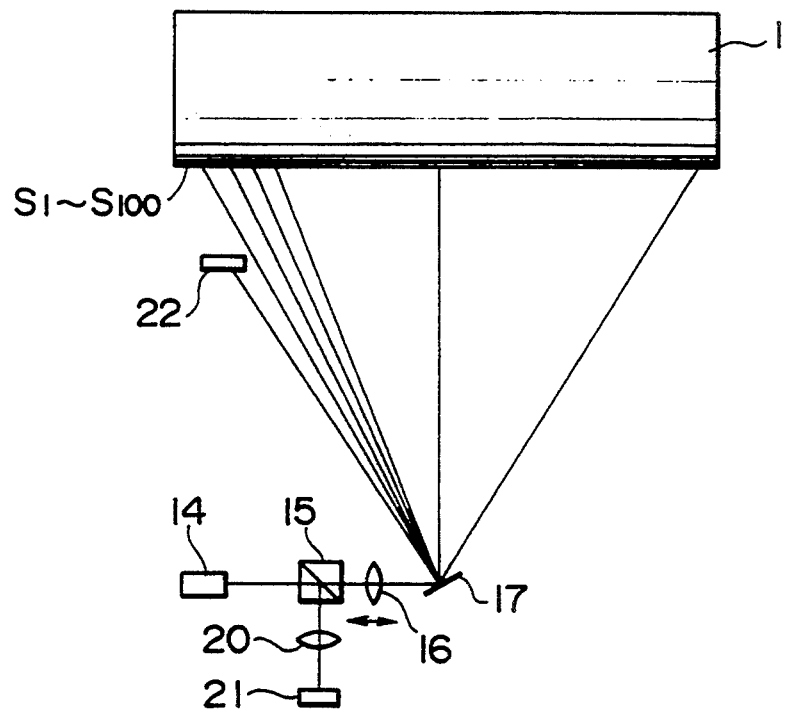
Figure 18:
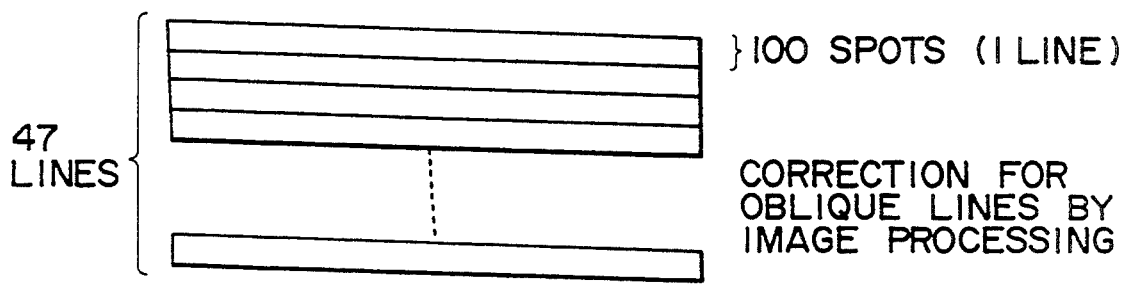
Figure 19:
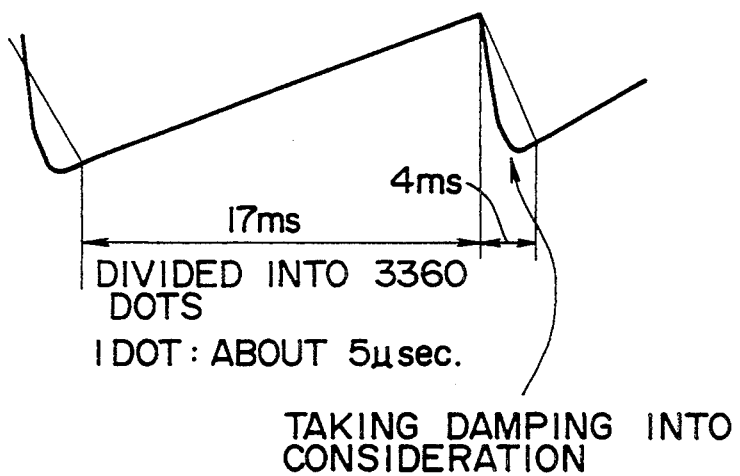
Figure 20:
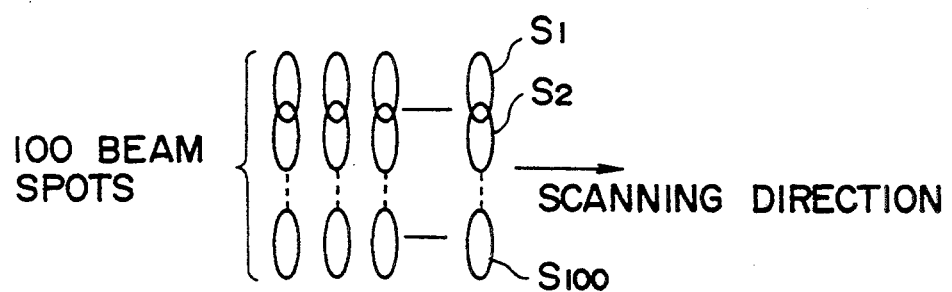
Figure 21:
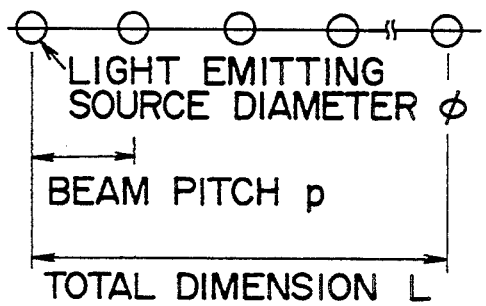
Figure 22:
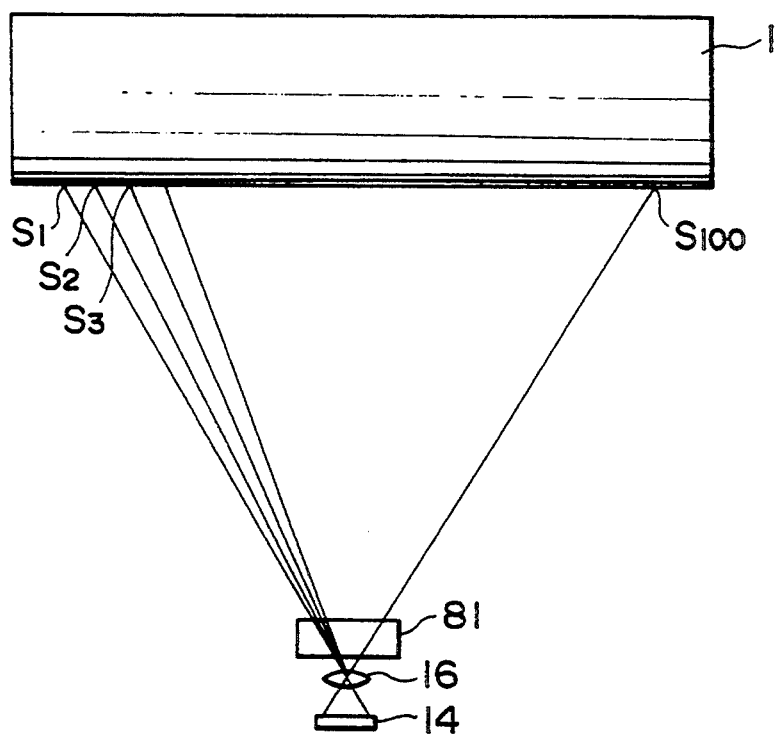
Figure 23:
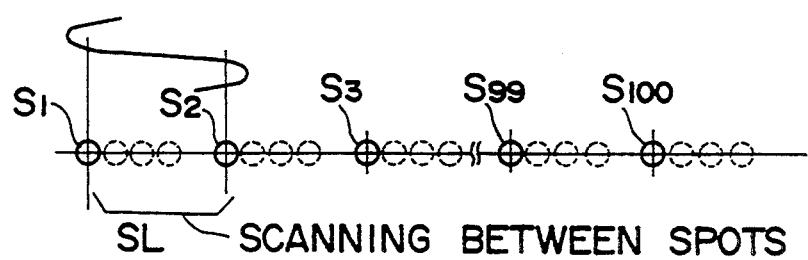
Figure 25:
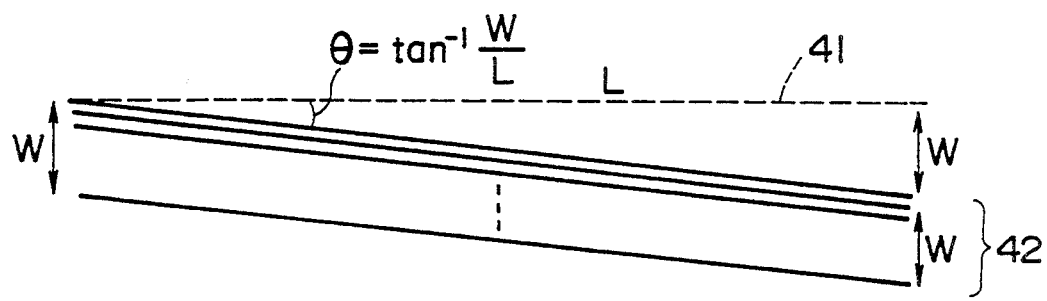
Figure 26:
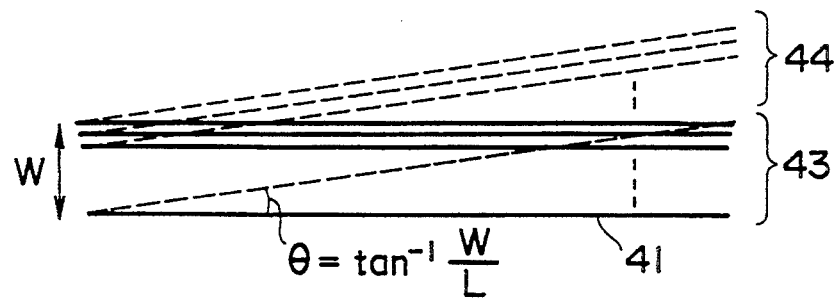
Figure 27:
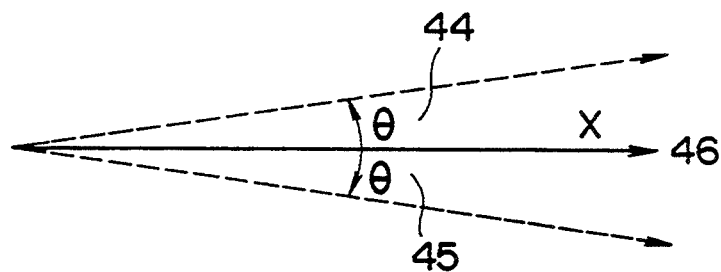
Figure 28:
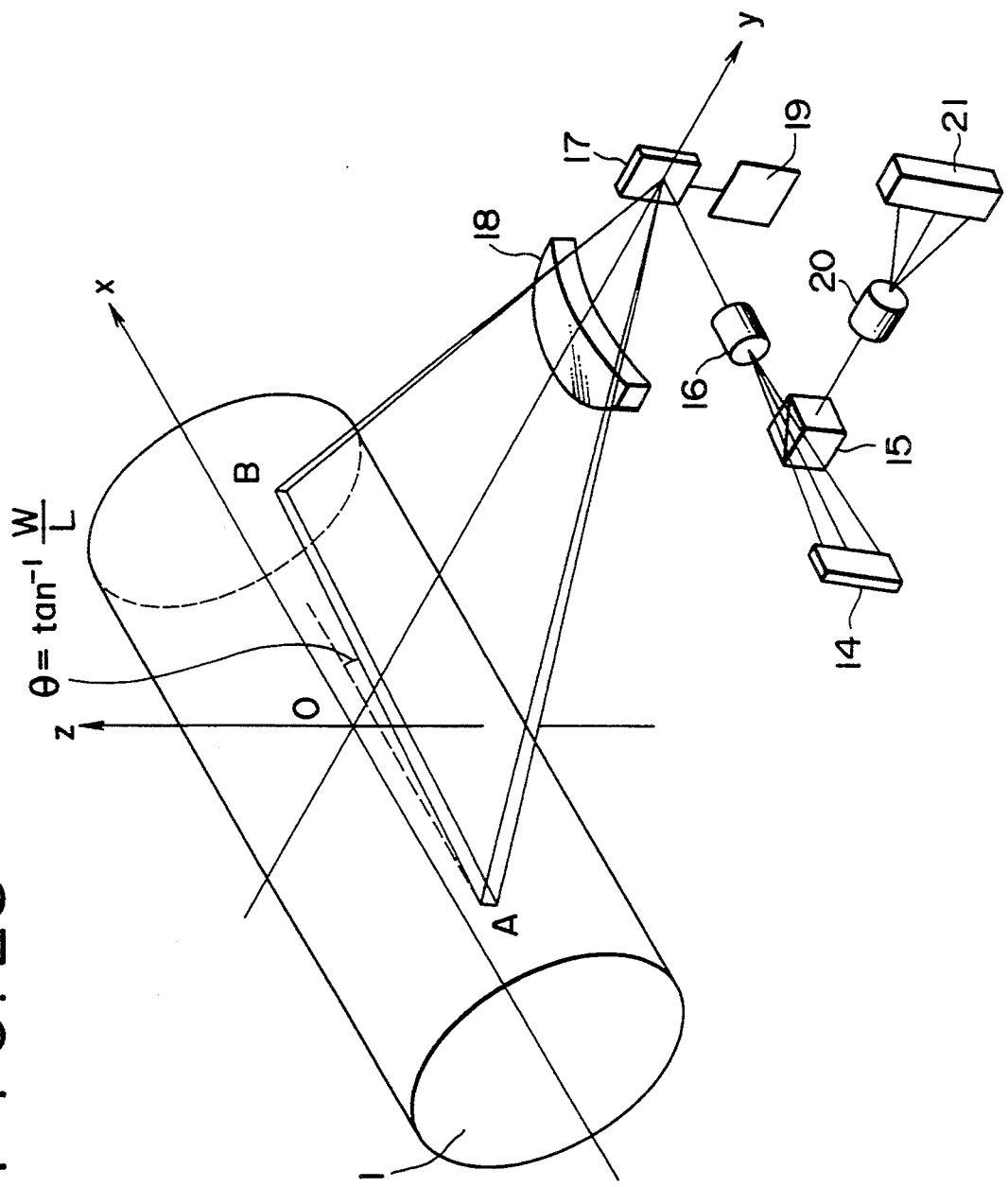
Figure 29:
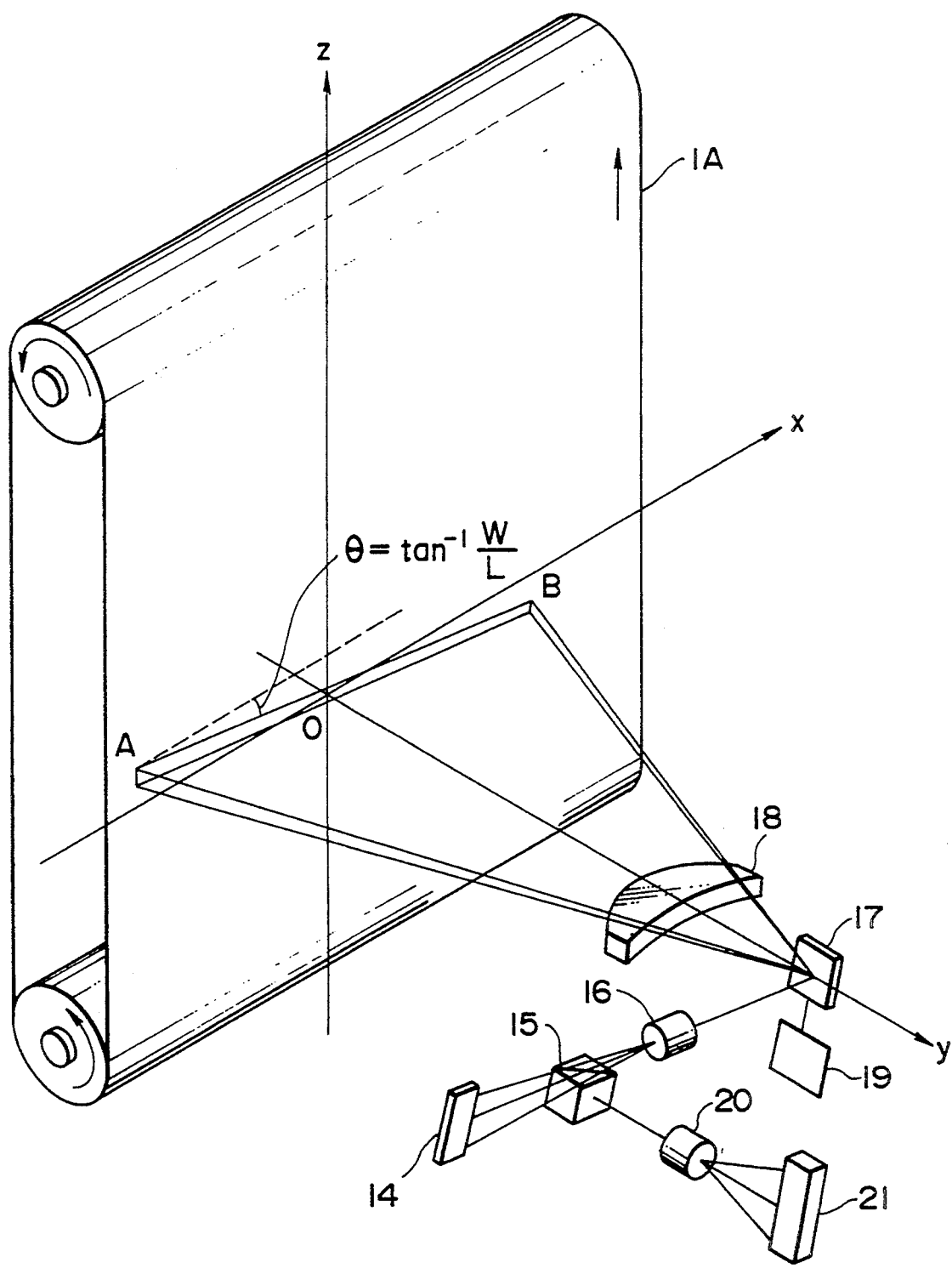

FIGS. 4(a) and 4(b) are diagrammatic views illustrating correction of deformation of an image when an fθ lens is employed;

FIGS. 5(a) and 5(b) are similar vies but illustrating correction of deformation of an image when an fθ lens is not employed;

FIGS. 6(a) and 6(b) are similar views but illustrating the principle of moving an image forming position while keeping the enlargement ratio fixed;

FIG. 7 is a diagrammatic view showing a zoom lens;

FIGS. 8(a) and 8(b) are diagrammatic views illustrating a relationship between the enlargement ratio and the image position when a zoom lens is moved;

FIG. 9 is a sectional view showing a lens moving mechanism;

FIGS. 10(a) to 10(c) are schematic views illustrating the principle of correction of the enlargement ratio when a lens is moved;

FIG. 11 is a block diagram showing a signal processing system of the laser beam printer shown in FIG. 1;

FIG. 12 is a block diagram showing detailed construction of a PWM circuit of the signal processing system shown in FIG. 11;

FIG. 13(a) to 13(d) are timing charts illustrating operation of the PWM circuit of FIG. 12;

FIG. 14 is a schematic view illustrating data to be stored into an image memory of the signal processing system shown in FIG. 11;

FIG. 15 is a diagrammatic view illustrating a relationship between a laser and a line CCD of the laser beam printer shown in FIG. 1;

FIG. 16 is a diagram illustrating a relationship between spots of laser beams irradiated upon the line CCD of the laser beam printer of FIG. 1 and light receiving elements constituting the line CCD;

FIG. 17 is a schematic view illustrating scanning of a rotary drum when a plurality of beam spots are disposed in a vertical direction;

FIG. 18 is a schematic view illustrating the shape of a raster when the rotary drum shown FIG. 17 is rotated continuously;

FIG. 19 is a diagram showing a driving waveform for a galvano mirror in the arrangement shown in FIG. 17;

FIG. 20 is a schematic illustration showing a shape of beam .sSpots formed by the arrangement of FIG. 17;

FIG. 21 is a diagrammatic view illustrating a relationship between a diameter of light emitting sources and a pitch of beams;

FIG. 22 is a schematic view illustrating a relationship between beam spots and a rotary drum when the spots are disposed in a horizontal direction;

FIG. 23 is a schematic view illustrating a scanning operation of spots in the arrangement shown in FIG. 22;

FIG. 24 is a table showing differences between the case wherein beam spots are disposed in a horizontal direction and the case wherein they are disposed in a vertical direction;

FIG. 25 is a schematic view illustrating an angle of rotation upon writing;

FIG. 26 is a similar view but illustrating rotation of image data;

FIG. 27 is a diagrammatic view illustrating an offset of rotation;

FIG. 28 is a schematic view of another laser beam printer wherein an optical system is mounted in an inclined relationship with respect to a rotary drum; and FIG. 29 is a schematic view of a further laser beam printer which employs a photosensitive belt.

DETAILED DESCRIPTION OF THE PREFERRED EMBODIMENTS

Referring first to FIG. 1, there is shown a laser beam printer to which an image drawing apparatus of the present invention is applied. The laser beam printer shown includes a rotary drum 1 which is rotated by a stepping motor 11 by way of a belt 12. The laser beam printer further includes a laser 14 which may be an integrated semiconductor laser and generates, for example, 100 laser beams. A laser of the type just mentioned is disclosed, for example, in Electronic Material, December, 1990, pp. 95-99. One hundred laser beams are emitted from the laser 14 and introduced into a lens set 16 by way of a beam splitter 15. In the present laser beam printer, the 100 laser beams are disposed in a vertical column. The laser beams having passed the lens set 16 are reflected by a galvano mirror 17 and irradiated upon the rotary drum 1 by way of an f$\theta$ lens 18. The 100 laser beams are partially separated by the beam splitter 15 with the number maintained and are then introduced into a line CCD (charge coupled device) 21 serving as a light intensity detecting element by way of a detecting lens set 20.

The galvano mirror 17 is rotated by a motor 19. A drive circuit 36 drives the motor 19 and detects a position of rotation of the motor 19 and hence of the galvano mirror 17. The drive circuit 36 has an analog to digital converter and a digital to analog converter built therein and converts digital data supplied thereto from a CPU/DSP 39 into analog data to drive the motor 19 but converts an analog position signal from the motor 19 into digital data and supplies the digital data to the CPU/DSP 39. The CPU/DSP 39 has a program for controlling operation stored in a memory built therein and controls various components of the laser beam printer in accordance with the program. A controlling section 40 generates clocks and various timing signals and outputs them to the various components. A detection amplifier 35 converts an output of the line CCD 21 from analog into digital data and supplies the digital data to the CPU/DSP 39.

A lens drive circuit 34 converts output digital data of the CPU/DSP 39 into analog data to drive at least one of lenses of the lens set 16. Meanwhile, a laser drive circuit 33 generates a PWM signal in accordance with data from the CPU/DSP 39 to drive the laser 14. A temperature detecting circuit 32 detects a temperature of the laser 14 or the inside of a body not shown of the laser beam printer, converts the temperature data from analog into digital data and outputs the digital data to the CPU/DSP 39. A correction ROM 37 has stored in advance therein data necessary to drive the laser 14 and the lens set 16. A drive circuit 31 drives the stepping motor 11 in accordance with an output signal of the CPU/DSP 39. A signal memory 38 stores therein an input signal supplied thereto from a circuit not shown.

Subsequently, basic operation of the laser beam printer will be described. Data for an image to be drawn on the rotary drum 1 is inputted from the external circuit not shown to and stored into the signal memory 38. The CPU/DSP 39 reads out the data stored in the signal memory 38 and drives the laser 14 in accordance with the data by way of the laser drive circuit 33. Consequently, the laser 14 emits 100 laser beams. The 100 laser beams are introduced to the galvano mirror 17 by way of the beam splitter 15 and the lens set 16. The 100 laser beams are thus reflected by the galvano mirror 17 and irradiated upon the rotary drum 1 by way of the f$\theta$ lens 18. The CPU/DSP 39 drives the motor 19 by way of the drive circuit 36 to rotate the galvano mirror 17. Consequently, the 100 laser beams disposed in the vertical column are scanned at a time on the rotary drum 1 substantially horizontally in a direction, for example, from the left to the right in FIG. 1. The rotary drum 1 is rotated by the stepping motor 11 in accordance with the scanning by the galvano mirror 17. Consequently, an image in accordance with the image data stored in the signal memory 38 is drawn on the rotary drum 1.

It is otherwise possible to construct the rotary drum 1 such that it is rotated by an amount corresponding to a width of the 100 laser beams after the scanning of the 100 laser beams in the horizontal direction is completed. However, if the laser beam printer is actually constructed in this manner, then rotation of the rotary drum 1 becomes intermittent, and consequently, it becomes difficult to accurately control the position of rotation of the rotary drum 1. Therefore, preferably the rotary drum 1 is rotated continuously at a fixed speed.

Figure 2:
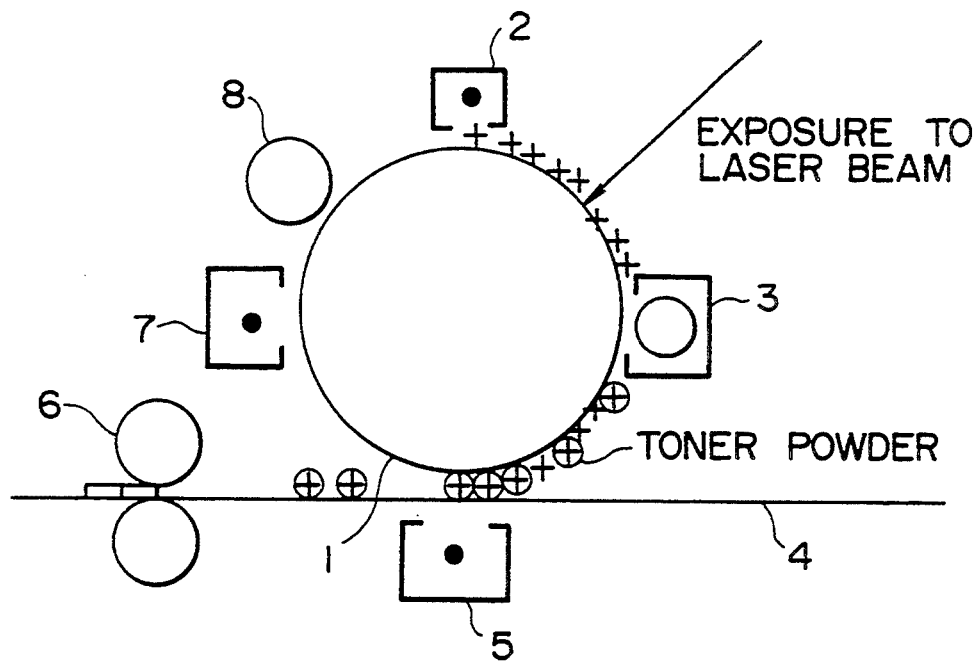
FIG. 2 is a schematic view illustrating a printing process in the laser beam printer shown in FIG. 1.

FIG. 2 illustrates the principle in accordance with which an image drawn on the rotary drum 1 is transferred to paper. Referring to FIG. 2, the rotary drum 1 is charged, for example, with positive charge by a corona charger 2. At each position of the rotary drum 1 at which a laser beam is irradiated, that is, at each position at which it is exposed to light or a laser beam, the surface resistance drops and the charge there disappears. In other words, a latent image is formed with electric charge on the rotary drum 1. A developing unit 3 supplies toner powder in a charged condition so that the toner powder sticks to the surface of the rotary drum 1. Development is thus performed by a repulsive or attractive force with the charge of the latent image. Either a portion of the rotary drum which has been illuminated by light is developed or a portion which has not been illuminated by light is developed depending upon whether the toner powder is charged with positive charge or with negative charge. A transfer unit 5 transfers the toner powder sticking to the rotary drum 1 to paper 4. The transferring operation is performed by making use of the charge of the toner powder on the rotary drum 1, causing the toner powder to be attracted from the rear side of the paper 4 by the electrostatic force to move to the paper 4. The toner powder transferred to the paper 4 is fixed by a fixing unit 6. The fixing operation is performed by heat and pressure. In particular, the paper 4 is passed between heat rolls so that the toner powder on the paper 4 is melted and deposited on the paper 4 by pressure.

A discharger 7 erases the latent image on the rotary drum 1 by corona charge. A cleaner 8 removes the toner powder remaining on the rotary drum 1 by means of a brush or the like to clean the rotary drum 1.

Referring back to FIG. 1, part of the energy of the 100 laser beams emitted from the laser 14 (which may be, for example, several percent of the energy of the entire laser beams) is reflected by the beam splitter 15 and introduced into the line CCD 21 by way of the detecting lens set 20. The line CCD 21 outputs a signal corresponding to the incident 100 laser beams. The signal is inputted to the detection amplifier 35, at which it is converted from analog into digital data, and then, it is supplied to the CPU/DSP 39. The CPU/DSP 39 compares the data inputted thereto from the detection amplifier 35 with data which has been read out from the signal memory 38 and supplied to the laser drive circuit 33 to drive the laser 14, and controls the laser drive circuit 33 so that the difference between the two data may be reduced to zero. Servoing is thus applied so that a laser intensity according to the image data may be obtained in this manner.

Figure 3:
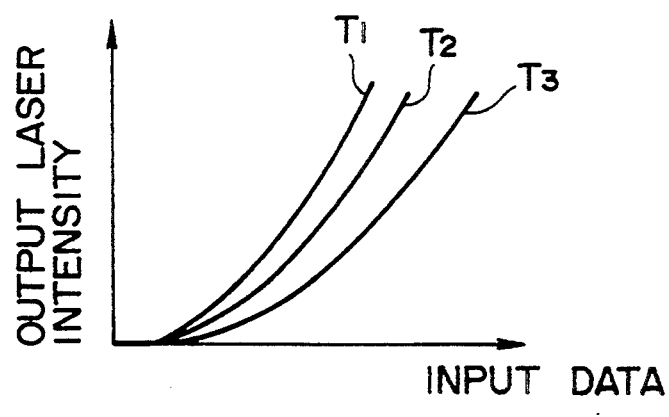
FIG. 3 is a diagram illustrating correction of the intensity of a laser beam in accordance with input data in the laser beam printer of FIG. 1.

The line CCD 21 receives the 100 laser beams at a time (parallelly) and delivers its output serially. In particular, the line CCD 21 transfers charge, which is generated as a result of reception of the 100 laser beams by means of a large number of light receiving elements disposed in a line, successively to the next light receiving elements and outputs it from the last light receiving element. Accordingly, the output of the line CCD 21 has a predetermined delay time from a light reception timing. As a result, the feedback system becomes difficult, and a γ curve which is forecast from each beam intensity is selected from within the correction ROM 37 and the intensity of the laser beam is corrected in accordance with the curve. The correction characteristic is set, for example, as shown in FIG. 3. Referring to FIG. 3, in the present laser beam printer, different characteristics are set using temperatures $T_1$ to $T_3$ as parameters. In particular, the laser 14 normally has a characteristic that the output level thereof decreases as the temperature rises. Therefore, the laser intensity is set so that it increases as the temperature rises ($T_1 > T_2 > T_3$). To this end, the temperature detecting circuit 32 detects a temperature of the laser 14 and outputs the temperature to the CPU/DSP 39. The CPU/DSP 39 thus selects a predetermined parameter in accordance with the temperature.

It is to be noted that the correction is performed for the 100 laser beams independently of one another. Further, it is possible to additionally adopt hysteresis correction which takes an influence of a surrounding condition of each beam into consideration.

Additionally, since the length of a light path between the galvano mirror 17 and a peripheral portion of the rotary drum 1 is longer than another light path between the galvano mirror 17 and a central portion of the rotary drum 1, the enlargement ratio is greater at a peripheral portion of the rotary drum 1, and if the fθ lens 18 is not employed, then such spool-shaped deformation of an image as shown in FIG. 10(b) takes place. However, in the present laser beam printer, since the fθ lens 18 is employed, spool-shaped deformation of an image must be removed basically. However, in the case of the present laser beam printer, since 100 laser beams are disposed in the vertical column, while some of them pass a substantially mid portion of the fθ lens 18 as shown in FIG. 4(a), the remaining laser beams pass peripheral portions of the fθ lens 18 (upper and lower end portions in FIG. 4(b)). Since an fθ lens is normally produced on the assumption that only one laser beam passes therethrough, it is designed so that a sufficient degree of accuracy is obtained at a horizontally central portion thereof, but since any deformation in a vertical direction is not taken into consideration, the accuracy at peripheral portions is low comparing with the accuracy at the central portion. As a result, there is no assurance that all of the 100 laser beams disposed in the vertical column are corrected so that they may be free from the fθ property, or rather, there is the possibility that the spool-shaped deformation may be increased or such barrel-shaped deformation as shown in FIG. 10(a) may be caused. Naturally, it is possible to effect sufficient correction for the 100 laser beams if the fθ lens 18 is designed with a high degree of accuracy. However, if this is performed actually, then the fθ lens 18 will be extremely expensive. Thus, in the present laser beam printer, the image deformation is corrected without raising the accuracy of the fθ lens 18 to a very high degree of accuracy.

To this end, in the present laser beam printer, at least one of the lenses of the lens set 16 is mounted for movement in the direction of an optical axis (in the leftward and rightward direction in FIG. 4). If the lens set 16 is moved in the direction of the optical axis in this manner to correct the deformation of an image so that the enlargement ratio at a mid portion of the rotary drum 1 and the enlargement ratios at left and right end portions of the rotary drum 1 may be equal to each other, then it is possible to omit the fθ lens 18 as shown in FIG. 5.

Correction of the enlargement ratio which is effected by moving at least one of a collimator lens 16a and an image forming lens 16b of the lens set 16 in the direction of the optical axis must necessarily be effected in accordance with scanning of the galvano mirror 17 (that is, the correction must necessarily be effected in accordance with the scanning position). To this end, the CPU/DSP 39 detects a position of rotation of the motor 19, that is, of the galvano mirror 17, by way of the drive circuit 36 and effects correction in accordance with the position of rotation (scanning position) of the motor 19. The correction ROM 37 has stored in advance therein data of driving positions of the movable lens corresponding to the scanning positions. The CPU/DSP 39 reads out the data and drives the movable lens by way of the lens drive circuit 34.

In particular, the correction ROM 37 has an equal pitch correction function and an enlargement ratio correction function stored therein. At least one of the lenses of the lens set 16 is moved in accordance with the enlargement ratio correction function of the correction ROM 37 so that the enlargement ratio may be fixed irrespective of the scanning position. Meanwhile, the speed of image reading clocks which are used to read out data from the signal memory 38 is controlled in accordance with the equal pitch correction function of the correction ROM 37. Consequently, the velocity deformation of the galvano mirror 17 is corrected so that a variation of the galvano mirror 17 by an equal angle may be a variation by an equal pitch. Meanwhile, the intensities of the laser beams are controlled in accordance with the position of rotation of the galvano mirror 17 so that a variation of an amount of exposure light by the speed may be corrected in accordance with brightness. The brightness correction is effected by controlling the pulse width of PWM pulses for driving the laser 14.

By the way, in order to make the enlargement ratio and the image forming point compatible with each other, the focal length of the lens set 16 must necessarily be made shorter at a central portion of the rotary drum and made longer at a peripheral portion. In order to realize this strictly, it is necessary to move both of the two lenses of the lens set 16, but if the tolerance of the enlargement ratio deformation within 0.1% is admitted, then it is possible to move only the lens 16a of the lens set 16 nearest to the laser 14 in the direction of the optical axis to fix the enlargement ratio and besides displace the image forming position. In the arrangement shown in FIGS. 6(a) and 6(b), a shorter focus Pc is formed at a central portion of the rotary drum 1 while a longer focus Pe is formed at a peripheral portion.

A zoom lens can be employed in order to satisfy both of the enlargement ratio and the focal length in this manner. FIGS. 7, 8(a) and 8(b) show simple examples of a zoom lens. In the arrangement shown FIG. 7, a convex lens 61 and a concave lens 62 are combined, and when the concave lens 62 is moved from the position A to the position B, the focus thereof is moved from a to b.

Meanwhile, FIGS. 8(a) and 8(b) show an arrangement wherein a convex lens 61 is moved with respect to a concave lens 62 and illustrate a manner in which the enlargement ratio and the focal length vary in accordance with the positions of the convex lens 61 and the concave lens 62. In the present arrangement, the distance L3 between the laser 14 and the convex lens 61 at a central portion of the rotary drum 1 is set shorter than the distance L1 between them at a peripheral portion of the rotary drum 1. Consequently, the distance from the concave lens 62 to the focus varies such that the distance L4 at a central portion (FIG. 8(b)) is shorter than the distance L2 at a peripheral portion (FIG. 8(a)). However, the enlargement ratio is fixed if the distances L1 to L4 are set so as to have the relationship $L2/L1 = L4/L3$.

FIG. 9 shows an exemplary construction for moving at least one of component lenses of the lens set 16. In the present arrangement, a movable lens 52 is supported on a lens holder 53, which is in turn supported on a support body 55 by way of a supporting spring member 54. A yoke 56 is mounted on an upper face of a magnet 57 and another yoke 59 is attached to a lower face of the magnet 57 so that magnetic fluxes flow along the route of the magnet 57 and yokes 59 and 56. A bobbin 60 is disposed in a magnetic gap formed between the yokes 56 and 59 and has an end secured to the lens holder 53, and a movable coil 58 is wound on the bobbin 60. An actuator 51 for driving the movable lens 52 is constructed in this manner.

When the movable coil 58 is energized, an electromagnetic force is generated thereby so that the movable lens 52 is moved in an upward or downward direction in FIG. 9.

As described above, in the present laser beam printer, one hundred laser beams are emitted from the laser 14, and an image is drawn at a time with the 100 laser beams. Accordingly, an image can be drawn at a very high speed comparing with an alternative case wherein an image is drawn with a single laser beam or with several laser beams to the utmost. Accordingly, when it is tried to achieve an equal drawing speed to that of conventional laser beam printers, for example, when it is tried to draw an image in the size of A4 in one second, the scanning speed of the laser beams in a horizontal direction can be made very slow, or in other words, the scanning speed may be reduced to 1/100 that of a conventional laser beam printer which employs a single laser beam. Accordingly, a polygon mirror which rotates at a high speed as in a conventional laser beam printer need not be employed, and a galvano mirror which turns at a low speed can be employed instead. Accordingly, also the speed of a movable lens which moves in accordance with rotation of the galvano mirror can be reduced, and it is possible to correct deformation of an image employing the actuator having such a construction as shown in FIG. 9.

In this manner, such spool-shaped deformation as shown in FIG. 10(b) which occurs when the f$\theta$ lens 18 is not involved can be corrected in such a manner as shown in FIG. 10(c). Furthermore, such barrel-shaped deformation as shown in FIG. 10(a) which occurs when the f$\theta$ lens 18 is provided can be corrected as seen from FIG. 10(c).

FIG. 11 shows more detailed construction of the circuit for signal processing. Referring to FIG. 11, image data of an image, for example, of the size of A4 of 210 mm × 295 mm which is represented by 3,360 × 4,700 dots and has such size is stored in an image memory 71, which corresponds to the signal memory 38 in FIG. 1, in such a manner as illustrated in FIG. 14. Data of, for example, 8 bits is allotted to one dot. The writing clocks therefor are, for example, 20/N MHz, where N is a number to be processed serially. If N is, for example, 8, then the clocks are 2.5 MHz.

N correction ROMs 72, which correspond to the correction ROM 37 in FIG. 1, are provided, and image data are read out from the image memory 71 and supplied to the correction ROMs. A correction circuit 74, which corresponds to the detection amplifier 35 and the CPU/DSP 39 in FIG. 1, compares the output of the line CCD 21 and data read out from the image memory 71 with each other and reads out data from the correction ROMs 72 in accordance with the result of the comparison. The correction data are supplied to an IC (integrated circuit) 73, which corresponds to the lens drive circuit 34 in FIG. 1. The IC 73 is constituted from N parallel to serial converters 73a, a line buffer memory 73b, 100 PWM circuits 73c and 100 driver 73d.

The data outputted from the correction ROMs 72 are converted from parallel data into serial data by the parallel to serial converters 73a and stored into the line buffer memory 73b. Since one picture element is constituted from data of 8 bits and 100 laser beams are emitted at a time, data of 8 bits for each laser beam, and accordingly, data of a total of 8 × 100 bits for the 100 laser beams, are stored into the line buffer memory 73b. The data of 8 × 100 bits are supplied to the PWM circuits 73c.

The PWM circuits 73c are provided corresponding to 100 laser beams. Each of the PWM circuits 73c converts corresponding data of 8 bits into a PWM signal and outputs the PWM signal to a corresponding one of the drivers 73d. The drivers 73d are provided corresponding to 100 laser beams and drive the 100 laser elements or light emitting points of the laser 14 in accordance with the corresponding PWM data. Consequently, the intensities of the 100 laser beams are adjusted to predetermined intensities independently of one another. It is to be noted that the clocks for the line buffer memory 73$b$ and the PWM circuits 73$c$ are, for example, 20 MHz and 50 MHz, respectively.

Meanwhile, an analog correction circuit 75, which corresponds to the temperature detecting circuit 32 and the CPU/DSP 39 in FIG. 1, detects an ambient temperature and controls the reference voltage VCC for the drivers 73$d$ in accordance with the temperature.

FIG. 12 shows an exemplary construction of the PWM circuits 73$c$. In the present construction, the PWM circuits 73$c$ are constituted from 100 comparators $73c_1$ to $73c_{100}$ and a gradation counter $73c_0$. Data DATA1 to DATA100 of 8 bits are supplied from the line buffer memory 73$b$ to the comparators $73c_1$ to $73c_{100}$, respectively, and a count value of the gradation counter $73c_0$ is supplied to the comparators $73c_1$ to $73c_{100}$. The comparators $73c_1$ to $73c_{100}$ individually compare the inputs thereto and output the logic 1 until the input data come into coincidence with the count value, whereafter they output the logic 0. Accordingly, if the gradation counter $73c_0$ counts, for example, the clocks of 50 MHz as shown by the curve (d) in FIG. 13 and the output of the gradation counter $73c_0$ corresponding to the count value is supplied to each of the comparators $73c_1$ to $73c_{100}$, then when the data inputted to each individual comparator is, for example, 256, the comparator outputs the logic 1 for a period of time corresponding to the input data (about 5 microseconds) as seen from the curve (a) of FIG. 13. Similarly, when the input data is M, the logic H is maintained for a period of time corresponding to M clocks, and for example, when the input data is 1, a PWM signal for maintaining the logic H for the period of time of one clock is outputted as seen from the curves (b) and (c) of FIG. 13, respectively. A PWM signal corresponding to input data is produced in this manner. The outputs of the comparators 73$c$1 to 73$c$100 are supplied to the drivers $73d_1$ to $73d_{100}$, respectively, so that they individually drive the corresponding laser elements or light emitting points of the laser 14.

It is otherwise possible to constitute the PWM circuits shown in FIG. 12 from counters to which data can be loaded.

FIG. 15 shows more detailed construction of the optical system wherein 100 laser beams are monitored by means of the line CCD 21. The laser 14 and the line CCD 21 are set so that the pitch of the light emitting points of the laser 14 from which a plurality of laser beams are generated and the pitch of the light receiving elements of the line CCD 21 may correspond to each other. For example, the enlargement ratio of the detecting lens set 20 is set so that it may be equal to an integral number of times (for example, 1 to 10 times) the beam pitch of the laser 14. If the magnification is increased, then the dispersion of the individual light receiving elements of the line CCD 21 is averaged so that detection of a higher degree of accuracy can be performed. It is to be noted that it is also possible to use part of the lens set 16 as the detecting lens set. If the enlargement ratio of the detecting lens set 20 is set to such a high value that a beam spot may extend over a plurality of light receiving elements of the line CCD 21, then also the horizontal width of the beam diameter is increased so that the beam spot will extend outwardly from the light receiving elements. Since the line CCD 21 detects the intensity of light, even if part of beams of light cannot be received, this does not theoretically make a very serious problem. However, in order to further improve the detecting sensitivity and so forth, it is necessary to make the enlargement ratio in the horizontal direction smaller than the enlargement ratio in the vertical direction (refer to FIG. 20). In this instance, for example, a cylindrical lens or an anamorphic prism can be employed.

FIG. 16 shows a condition wherein a plurality of laser beams are received by the line CCD 21 wherein a large number of light receiving elements are arranged in a row. As shown in FIG. 16, one beam of light is received by a plurality of light receiving elements. In a boundary area between two adjacent laser beams, the two adjacent beams of light are irradiated upon a same light receiving element or elements. Thus, it is possible to construct the optical system so as to detect only a central range W except a peripheral portion of the range in which intensities of adjacent beams of light are distributed. By the construction, the influence of adjacent beams can be reduced.

The timing at which the intensity of a beam is to be corrected can be set to a timing before printing of each line is performed, that is, when the laser beams are scanning outside the effective screen. Correction is performed by setting a predetermined initial value for each of 100 beams. Upon correction of the initial values, it is possible to repetitively change the condition several times, confirm the situations then and set the correction coefficients in accordance with the situations.

Further, in addition to the correction with the initial values, it is also possible to effect correction several times to several tens times at a predetermined interval of time during printing, i.e., in the course of scanning. In the course of scanning, if print data at a detection timing is extremely small or printing is not effected, then accurate comparison is difficult. Thus, it is possible to compare, only when there is a detection output or data input higher than a predetermined level, the two data and effect correction in accordance with the result of the comparison. Further, if detection is effected only for one dot, then the probability in which comparison can be performed decreases extremely. Thus, it is possible to use a plurality of detection dots (in the case of the greatest number, all dots between correcting operations) and compare an average value of them. In this instance, input data as a subject for comparison are averaged naturally.

Since correction is a following operation in principle, correction is not performed between two correcting operations. Accordingly, if there is a great variation in intensity of light between two adjacent correcting operations, then some irregularity will occur before the next correcting operation. Since it is considered that a principal cause by which the intensity of light is varied is heat generation of the laser 14 itself, printing hysteresis correction is effected. In the case of a multi-beam laser, since an influence of surrounding light emitting points is involved, correction is effected with reference not only to data of a light emitting point itself but also to data of light emitting points therearound. According to the hysteresis correction, a condition (temperature) of a laser element (light emitting point) is estimated from data of the laser element itself regarding printing till then and data of surrounding laser elements (dots adjacent thereto or spaced by several dot distances therefrom), and data which has been corrected by the amount is provided. Since the influence of the hysteresis differs to a great extent depending upon the structure, the mounting structure, the heat radiating condition, the power, the ambient temperature and so forth of the laser, after actual final conditions are decided, they are measured actually to determine a correction coefficient and the correction coefficient thus determined is stored into the correction ROM 37.

Also correction for the ambient temperature or the temperature of the laser 14 itself can be performed in a similar manner to the correction of data described above. However, if correction regarding the entire laser 14 is corrected individually in a similar manner, then the dynamic range in correction is increased. Therefore, correction for the entire laser 14 is made separate correction, and it is preferable, for example, to control the VCC voltage for driving the laser 14 (currents of the individual laser elements). The analog correction circuit 75 in FIG. 11 effects this correction.

FIG. 17 shows the optical system of the laser beam printer of FIG. 1 from above. A baffle plate 22 limits the irradiating range of laser beams so that unnecessary laser beams may not be irradiated upon the rotary drum 1. It can be seen from FIG. 17 that the distances of a central portion and a peripheral portion of the rotary drum 1 from the galvano mirror 17 (laser 14) are different from each other. One hundred laser beams are disposed in a direction perpendicular to the plane of FIG. 17, and the 100 laser beams are scanned in a direction, for example, from the left to the right in FIG. 17.

As a result, if the rotary drum 1 is rotated continuously at a predetermined speed, then such a raster as shown, for example, in FIG. 18 is formed on the rotary drum 1. As shown in FIG. 18, if the rotary drum 1 is rotated continuously, then the raster is inclined obliquely. Thus, by suitably processing image data by means of the CPU/DSP 39, an image can be controlled so that it may not be inclined obliquely. In particular, referring to FIG. 25, if the width of N lines to be written at a time with respect to a horizontal line as indicated by a broken line 41 in FIG. 25 is represented by W and the width of the image, that is, the length of the lines, is represented by L, then N lines 42 to be written at a time in a writing process of an image are deformed so that they are inclined rightwardly downwardly with respect to the horizontal line 41, and consequently, they are individually subject to rotation by an angle $\theta$ given by $\theta = \tan^{-1} W/L$.

Therefore, in the laser beam printer, individual lines of original image data 43 (data having the length L and the width W) are rotated in advance by the angle of $\theta = \tan^{-1} W/L$ with respect to the horizontal line 41 indicated by a solid line as seen in FIG. 26, that is, rotated so that they are inclined rightwardly upwardly as indicated by broken lines in FIG. 26, to obtain image data 44, and writing of data is performed using the image data 44.

Consequently, the angle $\theta$ in the rightwardly downward direction 45 upon data writing and the angle $\theta$ in the rightwardly upward direction 44 of image data cancel each other as seen in FIG. 27 so that a horizontal line having no deformation can be drawn on the rotary drum 1 as represented by a direction 46 of the printing output.

Laser beam printers which do not involve the processing described above will be described below with reference to FIGS. 28 and 29. The laser beam printers are modifications to the laser beam printer shown in FIG. 1 and include several common components. Thus, like parts or elements are denoted by like reference numerals and overlapping description thereof is omitted herein.

The laser beam printer shown in FIG. 28 employs a photosensitive drum 1 while the laser beam printer shown in FIG. 29 employs a photosensitive belt 1A in place of the photosensitive drum 1. Both of the laser beam printers shown in FIGS. 28 and 29 employ an optical system which has the same construction as the optical system of FIG. 1, but in the laser beam printers of FIGS. 28 and 29, the optical system is disposed in an inclined relationship with respect to the photosensitive drum 1 or the photosensitive belt 1A by the predetermined angle $\theta = \tan^{-1} W/L$.

Since the diagram of FIG. 27 illustrates the relationship on paper on which an image output is printed out, the inclination of the optical system when it is to be installed must be in the opposite direction to that shown in FIG. 27. In a laser beam printer, since an image is first formed on a photosensitive drum and then transferred to paper, the relationship of mirror images to each other is provided to the image on the drum and the image on the paper by the transfer step, and accordingly, the optical system must be installed so that a rightwardly downward inclination is provided to output laser beams.

Referring to FIG. 28, if the axis of rotation of the photosensitive drum 1 is set so that the x axis and the y and z axes are taken so that they extend perpendicularly to the x axis and pass the origin O which coincides with the center of the photosensitive drum 1, then the plane in which the optical system is to be placed is given by the x-y plane which is rotated by the angle $\theta = \tan^{-1} W/L$ in the clockwise direction around the y axis. In other words, the plane including the components from the multi-laser beam 14 to the f$\theta$ lens 18 is inclined by the angle $\theta = \tan^{-1} W/L$ with respect to the plane of the optical system shown in FIG. 1. Instead, the photosensitive drum 1 may naturally be inclined.

It is to be noted that, while the laser beam printer shown in FIG. 28 employs the photosensitive drum 1, since the surface of the photosensitive drum 1 is curved, the distances of light paths are different between those at the beginning and the end of scanning. Therefore, such a disadvantage as an out-of-focus condition may take place depending upon the performance of the optical system. In this instance, the laser beam printer should be constructed employing a photosensitive belt 1A in place of the photosensitive drum 1 as shown in FIG. 29. The angle over which the optical system is to be inclined is the same also where a photosensitive belt is employed.

In particular, referring to FIG. 29, if the origin O is placed at the center of the scanning area and the x axis is taken perpendicularly to a direction in which the photosensitive belt 1A is fed while the z axis is taken in the belt feeding direction, then the plane in which the optical system is to be placed is given by the x-y plane which is rotated by the angle $\theta = \tan^{-1} W/L$ in the clockwise direction around the y axis. By the arrangement, otherwise possible deformation of an image can be eliminated without the necessity of special signal processing.

FIG. 19 shows an example of a driving waveform for the galvano mirror 17. In the present example, the driving waveform is a saw-tooth-wave. If an image is drawn in the size of A4 in one second, then if 16 dots are included in 1 mm, the number of lines to be drawn in the size A4 is about 47 lines (refer to FIG. 18). Accordingly, the frequency of saw-tooth-waves is 47 Hz. If the effective ratio of the period of the saw-tooth-waves is 80%, then the length of the effective period is about 17 ms and the fly-back time is about 4 ms. The picture element frequency is about 200 kHz (actually 198 kHz=3,360/17). The final pulse width upon pulse width modulation is 19.5 ns (51 MHz) at 256 steps. The effective ratio mentioned above is determined taking damping in the fly-back time into consideration.

FIG. 20 shows a shape of spots of 100 laser beams irradiated upon the rotary drum 1. Preferably, each of the spots S1 to S100 has a vertically elongated elliptic shape as shown in FIG. 20 using a cylindrical lens, an anamorphic prism or the like. In particular, the enlargements in the vertical direction and the horizontal direction are made different from each other. If the shape of the spots is a true circle, then since printing is performed while the spots are being moved, the spots will shade off in the horizontal direction if the time for which one dot is exposed to light is not very short.

FIG. 21 illustrates a relationship between the diameter and the pitch of the light emitting sources (light emitting points) of the laser 14. When the 100 laser beams are disposed in the vertical column, preferably the ratio S $(=p/\phi)$ between the beam pitch p and the diameter $\phi$ of the light emitting sources is comparatively low (for example, equal to or less than 20). This is because, if the ratio S is high, then when the 100 laser beams are scanned in a horizontal direction, a range (gap) which is not scanned occurs in the horizontal direction. Consequently, such a countermeasure is required as to increase the size of the optical system or to fill up the gaps using a special optical system.

FIG. 22 shows a different arrangement of laser beams. In the present arrangement, one hundred laser beams are disposed in a horizontal row. As a result, one hundred spots $S_1$ to $S_{100}$ are disposed at a predetermined distance on a rotary drum 1. Then, as shown in FIG. 23, each spot scans within a range to an adjacent spot. Since the number of dots in the horizontal direction is 3,360, the distance between adjacent spots corresponds to 33 to 34 dots. For the scanning of the range for the 34 dots, not only a saw-tooth-wave but also a sine wave can be employed. The scanning frequency is 4.7 kHz. Since the amplitude is small in the case of scanning with a saw-tooth-wave, it is also possible to employ an acousto-optic element or a like element in place of a galvano mirror as a scanning system 81.

Further, in this instance, it is necessary to set the ratio S between the beam pitch p and the diameter $\phi$ of the light emitting sources to a value equal to or higher than 20 (for example, to 30). This is because, if the ratio S is lower, then the distance between adjacent spots on the rotary drum 1 is excessively small. In case the diameter $\phi$ of the light emitting sources is 1 $\mu$m, the pitch p is set to a value equal to or greater than 33 $\mu$m, particularly to about 50 $\mu$m or so including a margin. In this instance, since the total length of the laser 14 is equal to or greater than 5 mm, the diameter of the detecting lens set 20 must necessarily be made greater than that when the beam spots are otherwise disposed in the vertical direction. In order to avoid such increase of the lens diameter, the light emitting sources may be disposed, for example, on a sectoral line. Meanwhile, if the spots are disposed in the horizontal row in this manner, since the pitch between spots is greater, the influence of adjacent beam spots is reduced. Further, since the manner of reading out of data is not such a mere time series as in the case wherein the beam spots are disposed in the vertical column, it is somewhat complicated, but basically, the hysteresis should be corrected in a time series of data to be provided to laser beams.

FIG. 24 illustrates differences between the case wherein 100 laser beams are disposed in a horizontal row and the case wherein they are disposed in a vertical column. When they are disposed in a vertical column, the scanning angle by the galvano mirror 17 is several tens of degrees (for example, 40 degrees) and the scanning frequency is 47 Hz. Further, the picture element frequency is 200 kHz and the shape of the laser elements is short (for example, 0.5 mm to 1 mm). Further, the clock frequency is about 50 MHz.

On the other hand, when the spots are disposed in a horizontal row, the scanning angle is several tens of minutes (for example, 24 minutes) and the scanning frequency is 4.7 kHz. Meanwhile, the picture element frequency is 200 kHz in the case of scanning by saw-tooth-waves but 450 kHz in the case of scanning by sine waves. Further, the shape of the laser elements is long (for example, 5 mm or more). Furthermore, the clock frequency is 50 MHz in the case of scanning by saw-tooth-waves but 110 MHz in the case of scanning by sine waves.

Having now fully described the invention, it will be apparent to one of ordinary skill in the art that many changes and modifications can be made thereto without departing from the spirit and scope of the invention as set forth herein.

What is claimed is:

1. An image drawing apparatus for drawing an image from an image signal, the image drawing apparatus comprising:
    a light source for generating a plurality of beams of light, the plurality of beams of light being modulated by the image signal;
    deflecting means for deflecting the plurality of beams of light generated from the light source, the deflecting means moving between a first position and a second position;
    a rotary member positioned to receive the plurality of beams of light deflected by the deflecting means and that forms an image in response thereto; and
    lens means positioned between the light source and the deflecting means for correcting enlargement ratios of the plurality of beams of light such that the enlargement ratio at a left end, a mid-point, and a right end of the rotary member are substantially equal, the lens means varying the correction provided in response to a position of the deflecting means.

2. An image drawing apparatus according to claim 1, wherein said light source is an integrated semiconductor laser.

3. An image drawing apparatus according to claim 1, further comprising;
    a beam splitter for separating part of the plurality of beams of light generated from said light source;
    a line CCD for receiving the plurality of beams of light separated by said beam splitter; and
    controlling means for controlling the intensities of the plurality of beams of light in accordance with an output of said line CCD.

4. An image drawing apparatus according to claim 1 wherein the lens means comprises:
    a plurality of lenses; and moving means for moving at least one of the plurality of lenses in response to deflection by the deflecting means.

5. An image drawing apparatus according to claim 1, further comprising:
charging means for charging said rotary member;
developing means for developing an image in accordance with the predetermined image; and
transfer means for transferring the image obtained by the development to paper.

6. An image drawing apparatus according to claim 1, wherein the plurality of beams of light are disposed in a direction substantially perpendicular to deflecting direction by said deflecting means.

7. An image drawing apparatus according to claim 6, wherein said deflecting means includes a galvano mirror.

8. An image drawing apparatus according to claim 6, wherein the rotary member is a continuously rotating rotary member, and further comprising means for rotating the image signal by a predetermined angle given by $\tan^{-1} W/L$, where W is the distance from a last horizontal image point to a last actual image point, and L is the distance from a first actual image point to the last horizontal image point, the first actual image point being a first image location in a horizontal scan, the last horizontal image point being a last image location in an ideal horizontal scan., and the last actual image point being a last image location in the horizontal scan.

9. An image drawing apparatus according to claim 6, wherein the rotary member is a continuously rotating rotary member, and the light source is disposed in an inclined relationship with respect to the rotary member by a predetermined angle given by $\tan^{-1} W/L$, where W is the distance from a last horizontal image point to a last actual image point, and L is the distance from a first actual image point to the last horizontal image point, the first actual image point being a first image location in a horizontal scan, the last horizontal image point being a last image location in an ideal horizontal scan, and the last actual image point being a last image location in the horizontal scan.

10. An image drawing apparatus according to claim 1, wherein the plurality of beams of light are disposed in a direction substantially in parallel to the deflecting direction by said deflecting means.

11. The image drawing apparatus according to claim 10, wherein the deflecting means includes a galvano mirror.

12. The image drawing apparatus according to claim 10, wherein the deflecting means includes an acousto-optic element.

* * * * *